United States Patent [19]
Feiste

[11] Patent Number: 5,963,978
[45] Date of Patent: Oct. 5, 1999

[54] HIGH LEVEL (L2) CACHE AND METHOD FOR EFFICIENTLY UPDATING DIRECTORY ENTRIES UTILIZING AN N-POSITION PRIORITY QUEUE AND PRIORITY INDICATORS

[75] Inventor: Kurt Alan Feiste, Austin, Tex.

[73] Assignee: International Business Machines Corporation, Armonk, N.Y.

[21] Appl. No.: 08/726,944

[22] Filed: Oct. 7, 1996

[51] Int. Cl.$^6$ .............................. G06F 12/08; G06F 13/18
[52] U.S. Cl. ........................ 711/158; 711/122; 711/144; 711/146; 710/39; 710/54
[58] Field of Search ................................ 711/118, 122, 711/144, 146, 141, 151, 158; 395/874, 859; 710/39, 54

[56] References Cited

U.S. PATENT DOCUMENTS

| | | | |
|---|---|---|---|
| 3,623,006 | 11/1971 | Balakian et al. | 711/111 |
| 3,964,054 | 6/1976 | Annunziata et al. | 711/122 |
| 4,783,735 | 11/1988 | Miu et al. | 711/136 |
| 4,785,395 | 11/1988 | Keeley | 711/122 |
| 4,835,686 | 5/1989 | Furuya et al. | 711/136 |
| 5,265,232 | 11/1993 | Gannon et al. | 711/124 |
| 5,276,848 | 1/1994 | Gallagher et al. | 711/121 |
| 5,355,467 | 10/1994 | MacWilliams et al. | 711/146 |
| 5,530,933 | 6/1996 | Frink et al. | 711/141 |
| 5,649,157 | 7/1997 | Williams | 711/151 |

*Primary Examiner*—Glenn Gossage
*Attorney, Agent, or Firm*—Richard A. Henkler; Andrew J. Dillon

[57] ABSTRACT

A high-level (L2) cache and a efficient method for writing directory entries into an array of directory entries are disclosed. The high-level (L2) cache operates differently depending upon whether a MESI (Modified, Exclusive, Shared, Invalid) state of a cache line in Invalid or Modified when the cache line's low-level (L1) Inclusive bit is set. Initially, the high-level (L2) cache retrieves a directory entry from the array of directory entries. This directory entry is placed into an n-position priority queue. Associated with the n-position priority queue is a set of priority indicators. These priority indicators are updated when a directory entry is placed into the n-position priority queue to indicate which order the various directory entries were placed into the n-position priority queue. If the directory entry is waiting for results to be received from the system bus, the directory entry will remain in the queue until such results are received. If the directory entry is not waiting for results to be received, it will be written back to the array of directory entries. For the directory entries waiting upon results to be received, those entries will be modified using information contained in the results, then written to the array of directory entries. The high-level (L2) cache can also resolve collisions between a processor request and a system request originating from another computing unit. If a system request would not alter a line in the low-level (L1) cache, the high-level (L2) cache will wait until the system request finishes accessing a shared resource to process the processor request, thereby avoiding the sending of a RETRY signal to the processor.

10 Claims, 13 Drawing Sheets

HIGH LEVEL (L2) CACHE AND METHOD FOR EFFICIENTLY UPDATING DIRECTORY ENTRIES UTILIZING AN N-POSITION PRIORITY QUEUE AND PRIORITY INDICATORS

BACKGROUND OF THE INVENTION

1. Technical Field

The present invention relates generally to cache units contained within a data processing system. More specifically, the present invention relates to improving the coordination of operations between different level caches.

2. Description of the Related Art

Most modern data processing systems make use of caches to increase the rate at which they can process data. (As used herein, the term "data" refers to any type of information that can be stored in the memory of a data processing system. Specifically, data encompasses both program instructions and application data.) Generally, a cache is defined as a relatively small amount of relatively fast, expensive memory which resides between a processor and relatively large amount of slow, inexpensive memory (main memory). A cache attempts to store those portions of main memory which will be needed by the processor. When the processor needs data from main memory, it will first check to see if that data is in the cache. If the data requested by the processor is in the cache, the cache simply returns that data to the processor. This type of operation allows the processor to avoid having to access main memory. Since accessing the cache is faster than accessing main memory, the rate at which data is processed by the processor is increased.

A cache is comprised of a cache controller and cache random access memory (RAM). The cache RAM serves as a storage area for cache line data, while the cache controller controls the storage and retrieval of cache line data from the cache RAM. The cache RAM is often divided into "blocks" or "lines," with each line having an associated "tag" and attribute bits The lines in cache RAM contain the actual data from main memory. The data from main memory that is stored in the cache RAM is referred to as cache line data. The tags specify which portion of main memory is contained in the line. A tag and associated attribute bits are often known as a directory entry, and the area of a cache's RAM which is used to store the directory entries is referred to as an array of directory entries (or a directory array).

Many modern processors use more than one cache to increase performance. One common arrangement is to have one small cache located on the same silicon die as the microprocessor. A cache that is located on the same silicon die, or otherwise very closely associated with a microprocessor, is often known as a Level one or L1 cache. Another cache, known as the Level two or L2 cache, can be placed apart from the microprocessor and the L1 cache. The L2 cache resides between the processor and main memory, and functions in a manner similar to that of the L1 cache. The L2 cache is almost always larger than the L1 cache, but the L2 cache cannot provide data to the processor as quickly as the L1 cache.

In operation, if the processor requires data from main memory, it will first check the L1 cache to see if that data is stored there. If the requested data is in the L1 cache, the L1 cache will forward this data to the processor and the processor will continue processing data. If the requested data is not in the L1 cache, the processor will look to the L2 cache for the data. If the requested data is in the L2 cache, the data will be forwarded to the processor. Data from the L2 cache cannot be retrieved as quickly as data from the L1 cache, but, retrieving data from the L2 cache is still much faster than retrieving the data from main memory. If the data requested by the processor is not in the L2 cache, the processor will retrieve the data from main memory, and will encounter significant performance penalties. The ability of a cache to quickly forward data to a processor can significantly affect the performance of the data processing system as a whole. Therefore, almost all aspects of a cache's organization, function, and size have been the subject of intense scrutiny.

Caches which are designed to be used in data processing systems with multiple processors contain additional levels of complexity. Caches operating in multiple processor systems must have the ability to monitor the data being stored and retrieved from main memory by other computing units (the term "computing units" refers to devices which can access main memory or other devices attached to a common system bus). Otherwise, the various computing units within the data processing system may interfere with each other's ability to accurately store and retrieve data from main memory. Caches use the attribute bits associated with each line of a cache to keep the contents of the cache consistent with the data contained in main memory.

Two of the attribute bits contain the (Modified, Exclusive, Shared, Invalid) "MESI" state of the line in the cache. Depending on the state of these bits, a cache controller can delay another computing unit from accessing main memory in order to update main memory with a new value contained in the cache line. For a more detailed explanation of how the MESI state of a cache line affects various computing operations, see the "Power PC 604 RISC Microprocessor User's Manual," by IBM Corp. and Motorola, Inc., (1994). Another attribute bit is known as the L1 Inclusive bit. When set, the L1 Inclusive bit indicates that a line in the L2 cache may be stored in the L1 cache as well.

Since the L2 cache serves as an interface to the system bus for the processor and the L1 cache, the L2 cache must know what areas of main memory are contained in the L1 cache and must know when a transaction occurring over the system bus would modify a section of main memory contained in the L1 cache. To accomplish this task, the L2 "snoops" the system bus for transactions which would modify an area of memory contained in its own cache as well as the L1 cache. "Snooping the bus" refers to the L2 cache monitoring the system bus for transactions which might have an effect on the state of a line within the L2 cache or the L1 cache.

When a line in an L2 cache has its L1 Inclusive bit set, many prior art caches process the line in the same manner regardless of whether the MESI state of the line is Invalid or Modified. However, operations in the data processing system can be enhanced by handling these situations in differently.

In addition, prior art caches have implemented inefficient flushing algorithms. As related to caches, flushing refers to writing all of the data that has been modified while in the cache to main memory. Flushing a cache ensures that all computing units which have access to main memory can access the same data at the same location. Also, when a cache is flushed, the MESI state of the lines within the cache is set to Invalid.

Another problem associated with prior art caches is their inability to efficiently update their directory array. The inefficiencies concern the writing of updated directory entries to the directory array. Many prior art systems use queues or other FIFO devices to buffer writes to the directory array. However, the switching involved in operating these FIFO devices consumes excessive amounts of power. Also, from a performance point of view, using FIFO devices can create a bottleneck. A bottleneck is created when an entry is first in line to be written to the directory array, and the writing of this entry is delayed because the entry is waiting to receive a result from the system bus. In traditional FIFO systems, other entries behind the entry first in line cannot be written to the directory array, and must wait on the entry which is first in line, even though these other entries are ready to be written to the directory array.

Yet another problem associated with prior art L2 caches is their handling of collisions. A collision occurs when a processor and another computing device (which could be another processor) try to access the same resource. This resource, typically, is an area of main memory. Since an L2 cache often resides between the processor and the system bus, the L2 cache is called upon to arbitrate between the processor's and other computing units competing requests to access the resource.

Typically, when an L2 cache controller detects a collision, it will send a RETRY signal to its processor. This RETRY signal will cause the processor to abort its attempted access of the shared resource, and will cause the processor to retry its access later. However, there are collision situations where an L2 cache can avoid sending a RETRY to the processor by simply delaying the processor's access of the shared resource for a short time period. This delay is often a much shorter period of time than the period of time it takes for the processor to retry an access.

Therefore, it would be desirable in a data processing system containing multiple computing units to have an L2 cache operable in a first mode of operation where a cache line is in a modified and inclusive state, and a second mode of operation where a cache line is in an invalid and inclusive state. In the first mode of operation, the L2 cache would, upon snooping a request, check a L1 cache to see if it had valid data. In this first mode of operation, if the L1 cache returns valid data to the L2 cache, the L2 cache writes this data to memory. If the L1 cache does not return data to the L2 cache, the L2 cache would write its copy of the data to memory.

In the second mode of operation, the L2 cache again queries the L1 cache for data. If the L1 cache does not return valid data to the L2 cache, the L2 cache does not write its copy of the data to memory. Instead, the L2 cache then knows that valid data exists in memory.

It would also be advantageous to have an L2 cache which implemented an efficient pipelined algorithm for flushing the L2 cache and for back-invalidating the L1 cache.

Also, an L2 cache which uses a priority queue to write directory entries to the directory array would be advantageous.

A final desirable goal is to provide an L2 cache which does not automatically send a RETRY signal to its processor in the event a collision is detected. Such an L2 cache should evaluate the situation and send a RETRY signal only when necessary.

SUMMARY OF THE INVENTION

It is therefore one object of the present invention to provide an L2 cache whose operation would depend upon whether the MESI state of a line was Invalid or Modified when the line's L1 Inclusive bit is set.

It is yet another object of the present invention to provide such an L2 cache which implements an efficient pipelined algorithm for flushing the L2 cache and for back-invalidating the L1 cache.

It is still another object of the present invention to provide an L2 cache whose operation is transparent to software applications.

Still another objective of the present invention is to use a priority queue in updating the directory array.

Another objective of the present invention is to have an L2 cache which avoids sending a RETRY signal to its processor, unless sending such a signal is necessary. Such an L2 cache should be able to delay the processor's attempted access of a resource, if possible, until there is no conflict with another computing unit.

The foregoing objectives are achieved as follows. An L2 (high-level) cache operating according to the present invention operates differently depending upon whether the MESI state of a line is Invalid or Modified, when the line's L1 Inclusive bit is set. Initially, the high-level L2 cache snoops a request from another computing unit for access to data previously stored in the high-level L2 cache. Next, the high-level L2 cache communicates to the other processors not to access the area of memory containing the data for some time. The high-level L2 cache then determines if the requested data stored in the high-level L2 cache is invalid or modified, and possibly stored in the low-level L1 cache. The high-level L2 cache then queries the low-level L1 cache to determine if the data is in the low-level L1 cache. If the data is contained in the low-level L1 cache and is modified, the data is returned from the low-level L1 cache to the high-level L2 cache, and from there is written to memory. If no data is returned, and the data in the high-level L2 cache is marked as modified, the data in the high-level L2 cache is written to memory.

Another method by which the high-level L2 cache utilizes the state of a line's low-level Inclusive bit when the line's MESI bits are set to the Invalid state begins when data is stored in both the low-level L1 cache and the high-level L2 cache. Next, the processor modifies the data and stores the modified data in the low-level L1 cache. The data in the high-level L2 cache is then marked as possibly available in the low-level L1 cache and invalid in the high-level L2 cache. This allows for coherency to be maintained between the high-level L2 and low-level L1 caches without transferring data from the low-level L1 cache to the high-level L2 cache.

The high-level L2 cache according to the present invention also implements an efficient pipelined algorithm for flushing the high-level L2 cache and back-invalidating the low-level L1 cache. Initially, an address calculation stage calculates the address of a directory entry contained in an array of directory entries every clock cycle. Connected to this address calculation stage is a directory entry lookup stage. The directory entry lookup stage receives an address from the address calculation stage and retrieves the directory entry to be modified from the array of directory entries. Finally, a directory entry modification stage, connected to the directory entry lookup stage, receives the directory entry from the directory entry lookup stage. The directory entry modification stage first looks to see if the directory entry is not marked as invalid. If the directory entry is already marked as invalid, no further processing need be performed on the directory entry. If the directory entry modification stage determines the directory entry to be not invalid, the directory entry modification stage invalidates the directory entry to create an invalid directory entry. Next, the directory entry modification stage stores the invalid directory entry in the array of directory entries. The address calculation stage, the directory entry lookup stage, and the directory entry modification stage within the high-level cache can perform a new operation every clock cycle. Also connected to the directory entry lookup stage is a castout stage. The castout stage receives a directory entry from the directory entry lookup stage and sends a flush signal to the associated processor. The flush signal directs the associated processor to invalidate a line in the low-level L1 cache which corresponds to the directory entry.

In addition, the high-level cache according to the present invention employs an efficient method for writing directory entries to an array of directory entries. Initially, the high-level cache retrieves a directory entry from the array of directory entries. This directory entry is placed into an n-position priority queue. Associated with the n-position priority queue is a set of priority indicators. These indicators are updated when the directory entry is placed into the n-position priority queue to indicate which order the various directory entries were placed into the n-position priority queue. If the directory entry is waiting for results to be received from the system bus, the directory entry will remain in the queue until such results are received from the system bus. If the directory entry is not waiting for results to be received, it will be written back to the array of directory entries. For the directory entries waiting upon results to be received, the directory entries will be modified using data contained in the results, then written to the array of directory entries.

The high-level L2 cache can also resolve collisions between processor requests originating from the processor and system requests originating from another computing unit attached to the system bus. First, the high-level L2 cache snoops a system request to access a shared resource. This shared resource is often an area of main memory contained in the high-level L2 cache. Next, the high-level L2 cache receives a processor request to access the shared resource also. The high-level L2 cache will delay sending an acknowledge signal to the processor. The high-level L2 cache then makes a determination as to whether data associated with the system request must be sent to the processor. If data associated with the system request would alter a line in the low-level L1 cache associated with the processor, a retry signal is sent to the processor. If the system request would not alter a line in the low-level L1 cache, the high-level L2 cache will wait until the system request finishes accessing the shared resource to process the processor request, thereby avoiding the sending of a retry signal to the processor.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
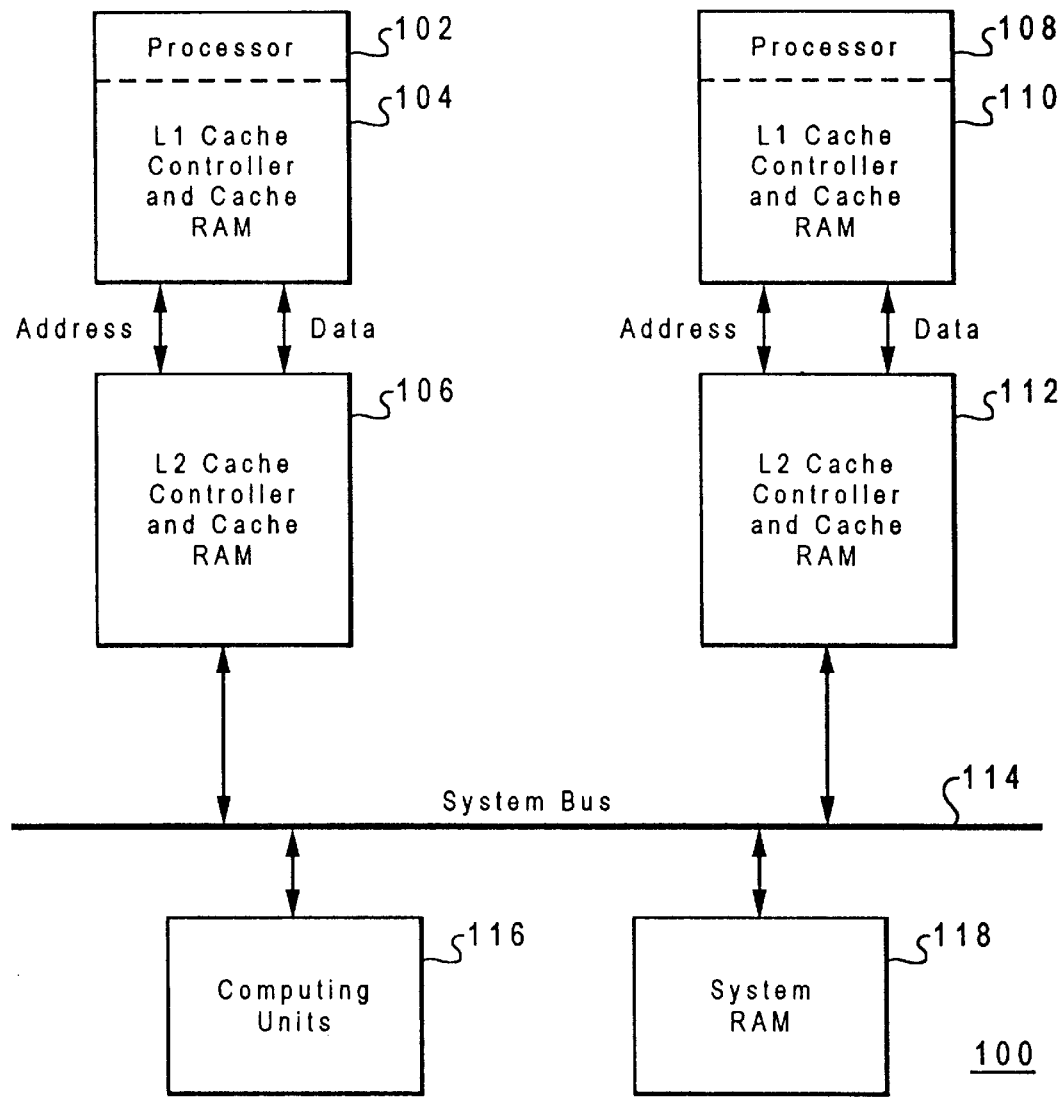
FIG. 1 illustrates a block diagram of a multiprocessor data processing system.

FIG. 1 illustrates a block diagram of a two-processor data processing system according to the present invention. Data processing system 100 contains processor 102 and low-level cache 104 (hereinafter referred to as L1 cache 104), which are attached to high-level cache 106 (hereinafter referred to L2 cache 106). In one embodiment, processor 102 and L1 cache 104 are integral, but this is not required for the present invention. L1 cache 104 contains a cache controller and cache RAM. L2 cache 106 is comprised of a cache controller and cache RAM.

L2 cache 106 is connected to L1 cache 104 and system bus 114, and functions according to the present invention. One feature of L2 cache 106 is that it will respond to requests snooped from system bus 114 differently, depending upon whether a cache line's MESI state is Invalid or Modified, when the line's L1 Inclusive bit is set (hereinafter referred to as the Invalid or Modified/L1 Inclusive state). If a line in L2 cache 106 is in the Invalid/L1 Inclusive state, L2 cache 106 will continue to snoop system bus 114 for requests which would affect that line with the knowledge that its copy of the line is invalid, but the copy of the line in L1 cache 104 may be valid. Likewise, when a line in L2 cache 106 is in a Modified/L1 Inclusive state, L2 cache 106 will snoop for requests which would affect the line, knowing that the data stored in the line is valid, but that L1 cache 104 may contain a more recent version of the data for that particular line. Computing Units 116 and System RAM 118 are also coupled to system bus 114.

Processor 108 L1 cache 110, and L2 cache 112 can operate in a manner similar to processor 102, L1 cache 104 and L2 cache 106. In the alternative, processor 108 L1 cache 110, and L2 cache 112 may operate as prior art devices, with L2 cache 112 not employing the present invention. Further, these devices need not be present in data processing system 100. L2 cache 106 increases the performance of data processing system 100 regardless of whether processor 102 is the only processor in data processing system 100.

Figure 2:
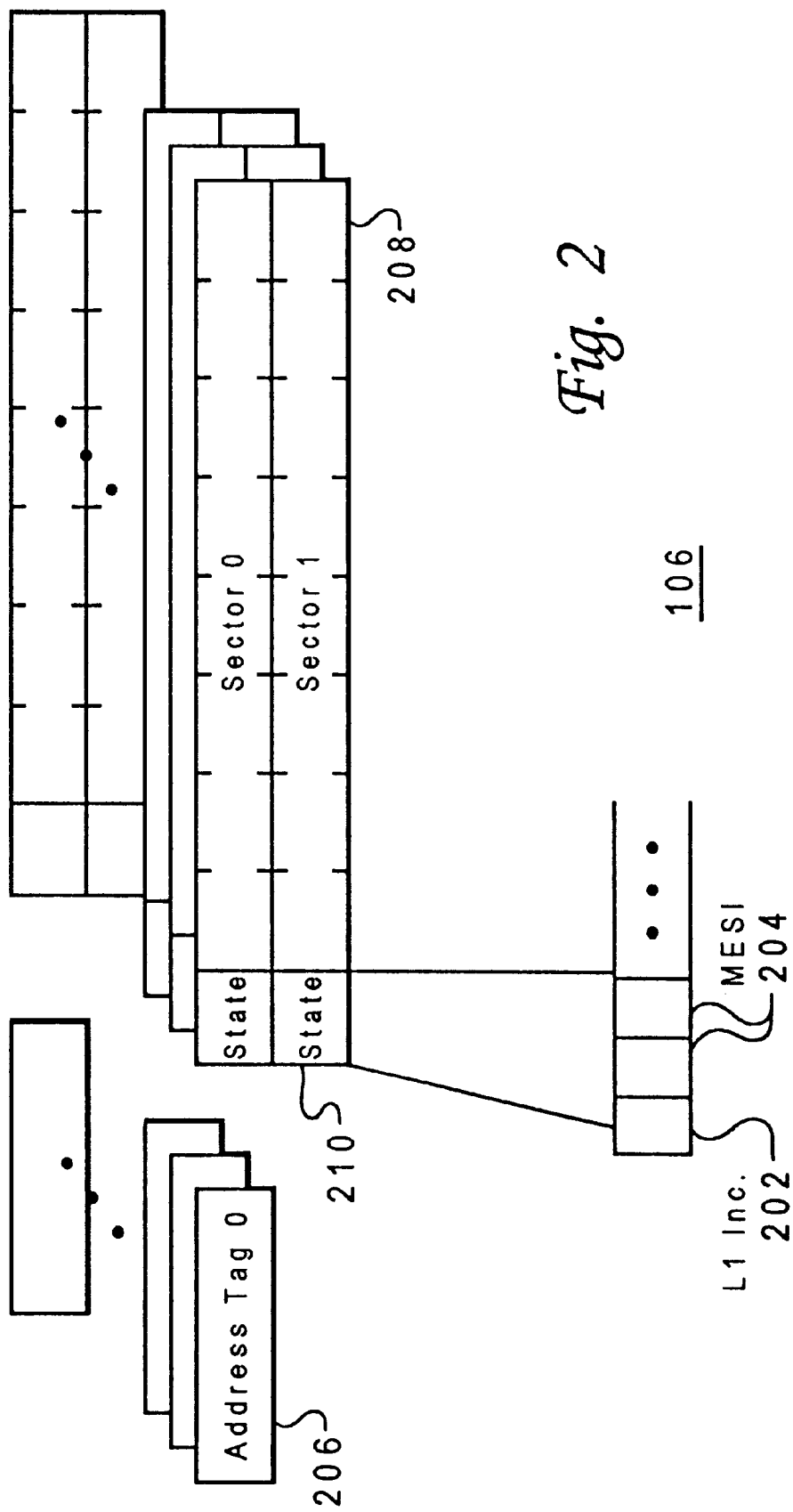
FIG. 2 depicts a direct mapped L2 cache according to the present invention.

FIG. 2 depicts a more detailed view of L2 cache 106, shown in FIG. 1. In FIG. 2, L2 cache 106 is organized to be a direct mapped cache as known in the art. Tags 206 identify which portion of main memory lines 208 contain. Appended to each line 208 is a series of attribute bits (also known as state bits), also known as a directory entry. Two of the bits within directory entry 210 are referred to as the MESI bits. The MESI bits 204 associated with a line indicate whether the line is in a Modified, Exclusive, Shared, or Invalid state. As stated above, each line 208 is associated with a set of MESI bits which allow cache 200 to perform in a system which can contain multiple computing units. In a preferred embodiment, lines 208 are segmented, with each segment containing a set of state bits. Also, L2 cache 106 stores data representing application data and instructions for the processor.

In addition to MESI bits 204, L1 Inclusive bit 202 is associated with each line 208. The inclusion of this bit allows the cache line data contained in lines 208 to be kept a super-set of the data contained in L1 cache 104. When L1 Inclusive bit 202 is clear (i.e., not set), L2 cache 106 will know the cache line data contained in sectors within lines 208 will be the most recent version of this data, when compared to L1 cache 104. However, when the L1 Inclusive bit for a given line is set and the line's MESI state is Modified or Invalid, the L2 cache controller is informed that a more recent version of the data in the particular line whose L1 Inclusive bit is set might be found in the L1 cache. In this state, the L2 cache controller continues to snoop the system bus for requests for the particular line. When a request for the line is detected, the L2 cache controller will request the L1 cache to provide the L2 cache with the valid data, if the L1 cache has valid data. If the processor does not respond with valid data, the L2 cache will either make available its copy of the data, or will know that valid data exists in main memory.

Many prior art cache systems disregarded the state of the L1 Inclusive bit for lines who are in the Invalid state. In the present invention, the L2 cache controller handles lines in the Invalid state differently, depending upon the state of their L1 Inclusive bit. If the MESI state of a line is Invalid and the L1 Inclusive bit is not set, the L2 cache controller will disregard the data contained in the line and its associated tag. This is the manner in which prior art systems treat a line who is in the Invalid state, regardless of the state of that line's L1 Inclusive bit.

Figure 3:
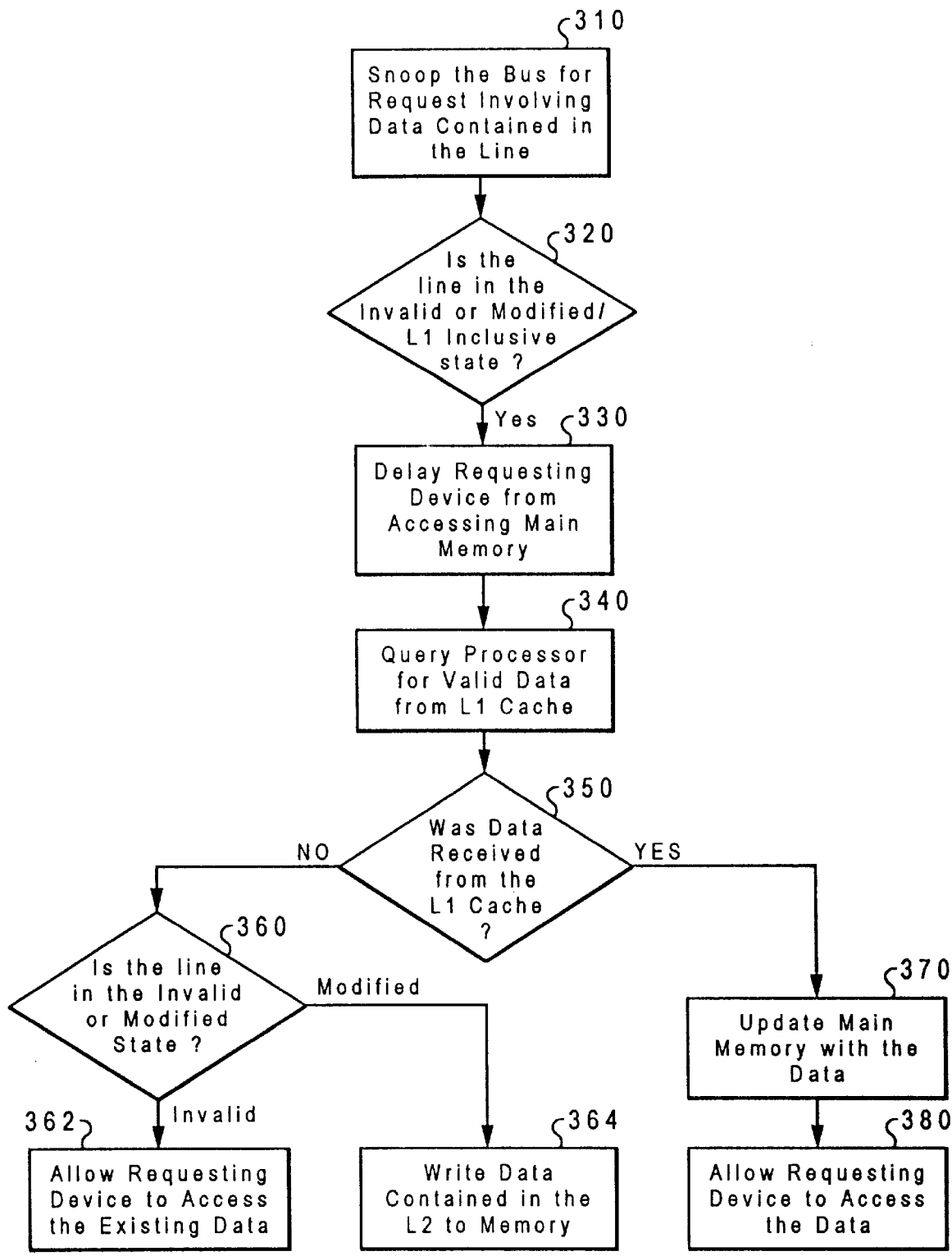
FIG. 3 is a flow chart illustrating the operational process of a cache operating in accordance with the present invention.

In the present invention, when a line is in the Invalid/L1 Inclusive state, the L2 cache controller knows the line in the L2 cache does not contain valid data, but that the corresponding line in the L1 cache might. FIG. 3 illustrates the operational process of L2 cache 106 operating in accordance with the present invention. The process starts with the L2 cache controller snooping the system bus for request to memory areas that have been cached by the L2 cache (step 310). If the L2 cache controller snoops a request for a line in its RAM marked as Modified/L1 Inclusive or Invalid/L1 Inclusive (step 320), the L2 cache controller will delay the requesting device from accessing main memory (step 330). In a preferred embodiment, a retry signal is sent from the L2 cache controller to the requesting device in order to remove the requesting device from the system bus. Next, the L2 cache controller will query the processor to see if the processor has a copy of the data requested in its L1 cache (step 340). The L2 cache controller must query the processor because the L2 cache has no way of knowing the state of the corresponding data in the L1 cache. If corresponding data in the L1 cache is in the Modified state (step 350), the processor will return this data to the L2 cache. If the data in the L1 cache is not in a Modified state, the processor will not forward any data to the L2 cache.

If the processor returns data to the L2 cache, the L2 cache will write this data to main memory (step 370), then let the requesting device access the data (step 380). If the line is in an Invalid/L1 Inclusive state, the L2 cache will reset its L1 Inclusive bit and leave its copy of the line in the Invalid state. If the line is in a Modified/L1 Inclusive state, the line's Inclusive bit will remain set, and the MESI state will change from Modified to either Shared or Invalid, depending upon the type of request snooped from the system bus. (If the MESI state of the line changes to Invalid, the L1 Inclusive bit will be reset.) The requesting device will then have access to the most recent version of the data.

If the processor does not return any data from the L1 cache, and the line is in an Invalid/L1 Inclusive state (step 360), neither the L1 cache nor the L2 cache will contain data that needs to be written to main memory before the requesting device accesses the data. In this case, the L2 cache controller will reset the line's L1 Inclusive bit and the requesting device will access the data already existing in main memory (step 362). If the processor does not return any data from the L1 cache, and the line is in a Modified/L1 Inclusive state (step 360), the L2 cache will contain the most recent version of the request data. In this situation, the L2 cache will write its data to main memory (step 364).

By operating in the manner described above, the present invention provides several advantages over the prior art. First, the present invention allows for the simple handling of processor write-through stores. In prior art systems, when a processor modifies selected bytes in a line contained in an L1 cache, the L2 cache must also modify the corresponding line in its cache in order to remain a super-set of the L1 cache. However, the L2 cache controller often cannot directly modify selected bytes in a line. It must first read the entire line, modify the selected bytes, then write the entire line back to the cache RAM.

In the present invention, the line which is modified in the L1 cache by the processor can be marked as Invalid/L1 Inclusive in the L2 cache. The L2 cache will then know that it does not have a good copy of the data contained in the line, but that the L1 cache may have a valid copy. The L2 cache will continue to snoop the system bus for transactions involving the line marked as Invalid/L1 Inclusive, and will report these transactions to the processor. Operating in this fashion allows the processor to write-through a small amount of data to main memory without having to modify an entire line in the L2 cache. The line in the L2 cache which contains the data written to main memory can simply be marked as Invalid/L1 Inclusive.

A second advantage of the present invention is realized in the event of an L2 RAM test failure. If the RAM which stores lines in the L2 cache is discovered to be defective during the power-on self test routines, the L2 cache will be prevented from caching data. However, the L2 cache controller can still store the address tags of lines stored in the L1 cache. For each line stored in the L1 cache, the L2 cache controller will mark the line in the L2 cache as being in the Invalid/L1 Inclusive state. The L2 cache will continue snooping the system bus for requests to lines stored in the L1 cache, and will report these transactions to the processor, even though the L2 cache cannot store any data. The data processing ability of such a system is severely degraded, but the data processing system can still function. In the event of a failure of the L2 cache RAM, most prior art systems cannot function.

Another advantage of the present invention is demonstrated during a normal power-up sequence. Often, the L2 cache will be disabled during power-up, so that diagnostic routines may be executed. An L2 cache operating according to the present invention will mark any lines requested by the processor as being in the Invalid/L1 Inclusive state. After the diagnostic routines have been executed and it is determined the L2 cache is in good operating order, the L2 cache will be enabled. After the L2 cache is enabled, data is cached in the L2 cache in a normal fashion. Also, the lines which were cached by the L1 cache before the L2 cache was enabled are still snooped correctly by the L2 cache. In many prior art data processing systems, software must flush lines from the L1 cache which were cached before the L2 cache was enabled.

Figure 4A:
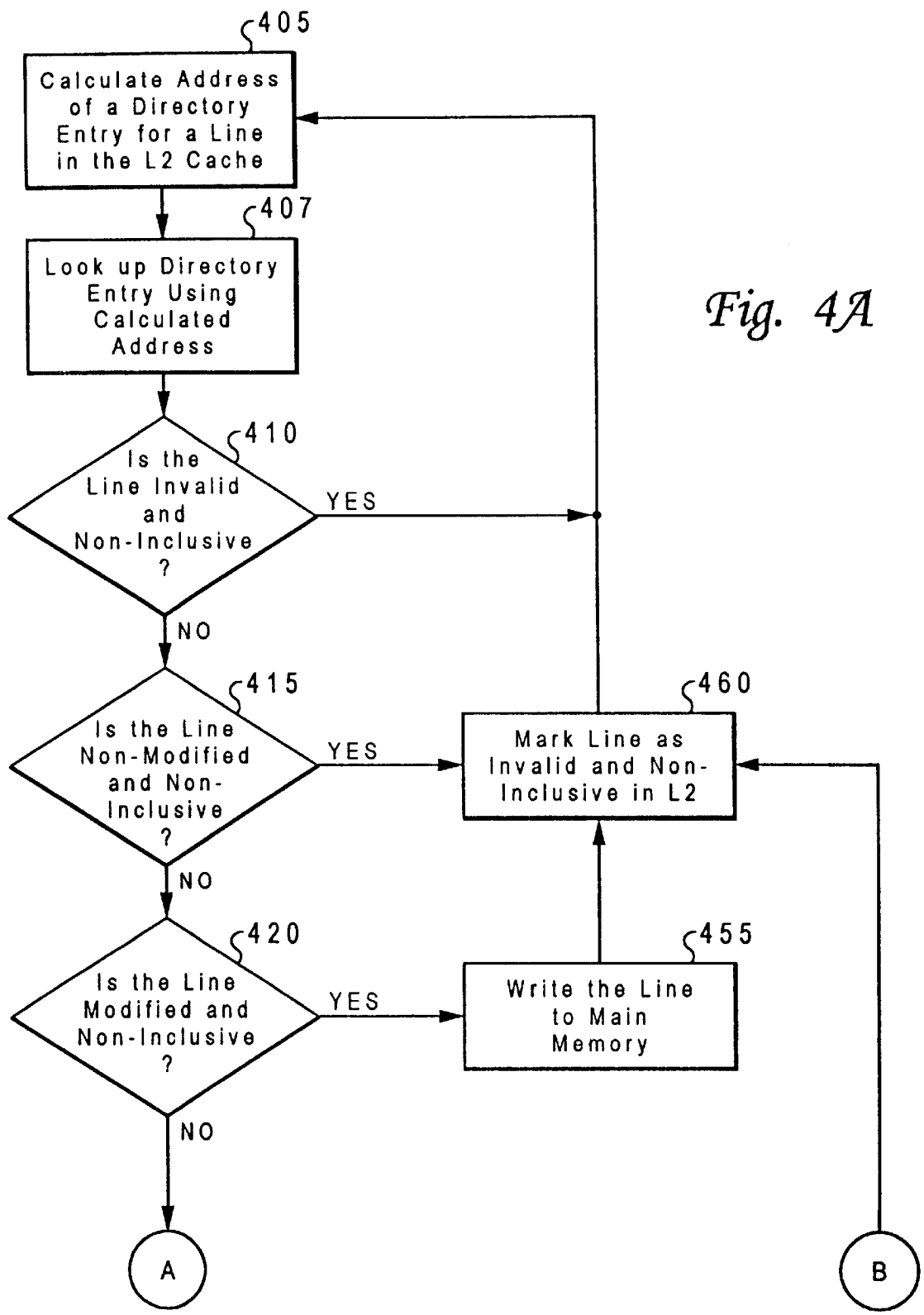
FIGS. 4A and 4B are a flowchart which illustrates the method used by the present invention for flushing the contents of an L2 cache and, at the same time, back invalidating the contents of an L1 cache.
Figure 4B:
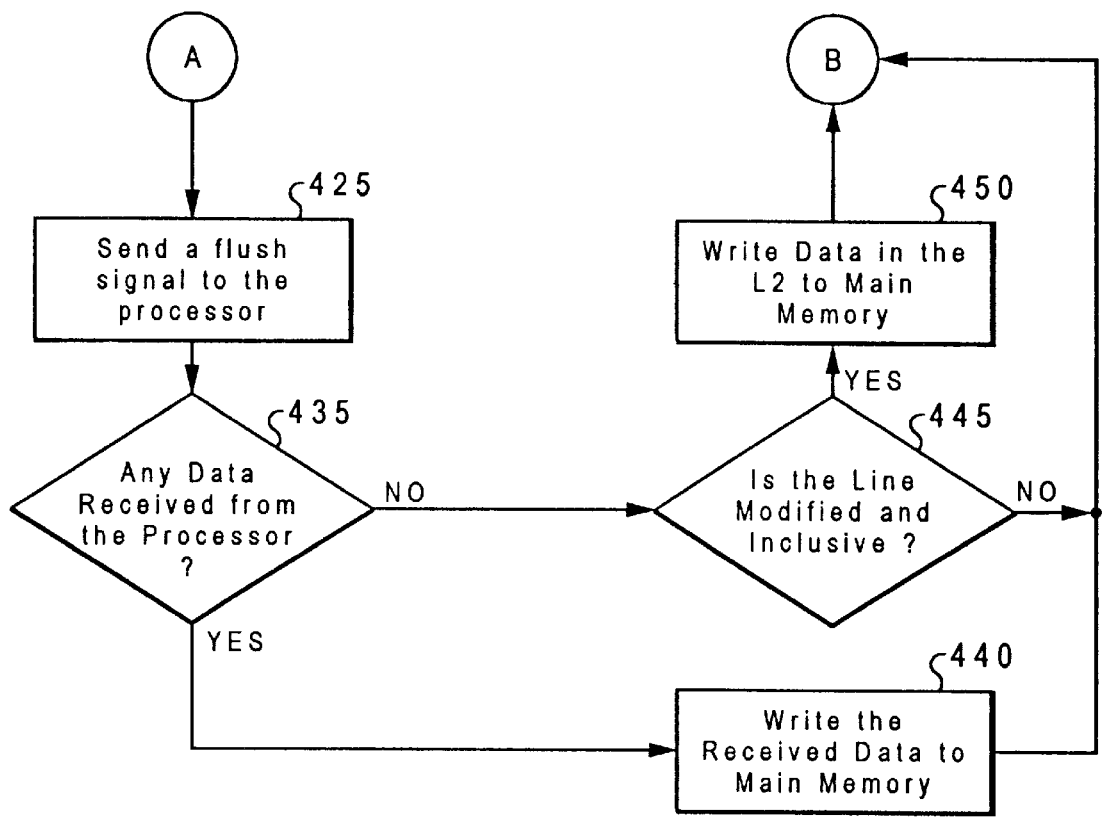

FIGS. 4A and 4B are a flowchart which illustrates a process for flushing the contents of the L2 cache and, at the same time, back invalidating the contents of the L1 cache. The process depicted in FIGS. 4A and 4B is initiated by setting a bit in a register which controls the operations of the L2 cache. To initiate the process, this bit, along with another bit which disables the use of L2 cache RAM are set. When these bits are set, the L2 cache will begin the process of flushing its contents and back invalidating the contents of the L1 cache. This flushing operation involves writing to main memory all of the lines in the L1 cache and the L2 cache which have been modified. After this process is complete, all of the lines in the L1 cache and the L2 cache will be marked as being in the Invalid state. When the flushing process is complete, the control bit which was set to initiate the flush will be reset. By polling the control bit, the processor can know when the flush operation is complete.

Upon setting the control bit which initiates the flushing process, the address of the first directory entry for a line in the L2 cache will be calculated (step 405). After an address is calculated, the directory entry in the L2 cache is retrieved (step 407). This directory entry will include a line's MESI bits, as well as its L1 Inclusive bit. After a directory entry has been retrieved, it is examined to determine what operations need to be performed in order to flush that particular line. If the directory entry indicates that the data in its line is in the Invalid/Non-Inclusive state (yes in step 410), the line can already be considered flushed and neither the directory entry nor main memory need to be modified. If the directory entry indicates the line is in a Non-Modified and Non-Inclusive state (yes in step 415), the directory entry is set to the Invalid/Non-Inclusive state (step 460), and is considered flushed. Again, no data from the L2 cache is written to main memory.

If the line is in the Modified/Non-Inclusive state (yes in step 420), the data within the line in the L2 cache will be a more recent version than the data contained in main memory. In this situation, the line in the L2 cache will be written to main memory (step 455), then, the line will be marked as Invalid/Non-Inclusive in the L2 cache (step 460).

If the process reaches point A without returning step 405, the line being processed has its L1 Inclusive bit set. If the line's Inclusive bit is set, a flush signal is sent to the processor (step 425). This flush signal will tell the processor to set the line in the L1 cache which corresponds to the line currently being processed in the L2 cache to the Invalid state. If the line in the L1 cache is in either the Invalid, the Shared, or the Exclusive state, no data from the processor will be returned to the L2 cache (step 435), because none of the data in the L1 cache is more recent than the corresponding data in the L2 cache. However, if the data in the L1 cache is marked as being in the Modified state, the processor will return this data to the L2 cache because the data is more recent in the L1 cache than in any other place in the data processing system (step 435).

If the L2 cache receives data from the processor in response to its flush signal, the data will be written by the L2 cache to main memory (step 440). After the data from the processor is written to main memory, the line in the L2 cache is marked as Invalid and Non-Inclusive (step 460).

If no data is returned from the processor, and the line in the L2 cache is marked as being in the Modified-Inclusive state (yes in step 445), the line in the L2 cache will be written to main memory (step 450). Next, the line in the L2 cache will be marked as being in the Invalid/Non-Inclusive state (step 460), and the process will return to step 405. This process will continue until all of the directory entries for the L2 cache have been processed.

Figure 5:
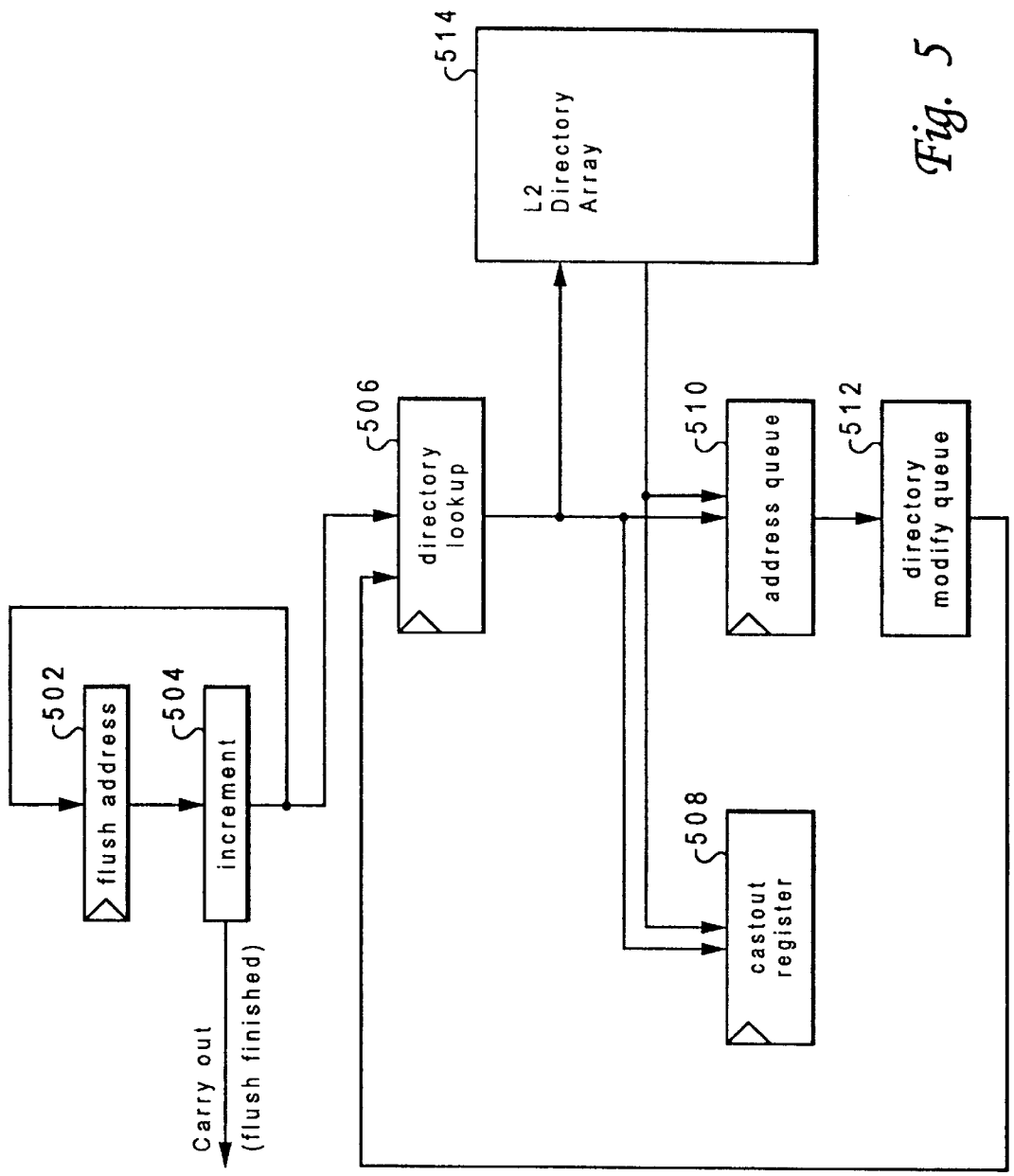
FIG. 5 illustrates a block diagram of a system for implementing the method illustrated in FIGS. 4A and 4B.

FIGS. 4A and 4B represent the logical flow of the process for flushing an L2 cache and back invalidating an L1 cache according to the present invention. FIG. 5 illustrates a block diagram of a system for implementing the method illustrated in FIGS. 4A and 4B. Flush address register 502 stores the address of the L2 directory entry to be processed next. This address is incremented by incrementing circuitry 504. When this new address is calculated, it is fed back into flush address register 502. This represents one stage of the pipeline for flushing the L2 cache and back invalidating the L1 cache. A new flush address can be calculated every clock cycle.

The address in flush address register 502 is communicated to directory entry lookup register 506. This register contains the address of the next entry to be retrieved from L2 directory array 514. When the L2 directory entry is retrieved, it is loaded into castout register 508 and address queue register 510. It takes one cycle to look up the directory entry whose address is contained in directory entry lookup register 506 and to load the directory entry into castout register 508 and address queue register 510. Once a directory entry is in address queue register 510, it will be analyzed to determine if the directory entry needs to be changed in L2 directory array 514. Unless the directory entry is in the Invalid/Non-Inclusive state, the directory entry in address queue register 510 will be placed into directory modify queue 512 so that it may be marked as being in the Invalid/Non-Inclusive state in L2 directory array 514. At the same time, if a flush signal needs to be sent to the processor, castout register 508 will inform the processor to check the line in the L1 cache which corresponds to the line currently being processed in the L2 array. The processor will determine if the line being processed contains data that needs to be written to main memory. If the directory entry is in a Modified/Non-Inclusive state, castout register 508 will cause the L2 cache to write the line to main memory.

Utilizing the process described above, an L2 cache operating in accordance with the present invention can flush one directory entry per cycle if that directory entry is in the Invalid/Non-Inclusive state. If the directory entry is in the Non-Modified/Non-Inclusive state, the L2 cache can flush one entry every two cycles. One cycle is used to read the entry from L2 directory array 514, and the other cycle is used to write the modified directory entry back to L2 directory array 514. The pipeline mechanism is stalled only if the L2 cache must write a line that is in the Modified state to main memory, or if the L2 cache has to back-invalidate the L1 cache via the processor.

Figure 6A:
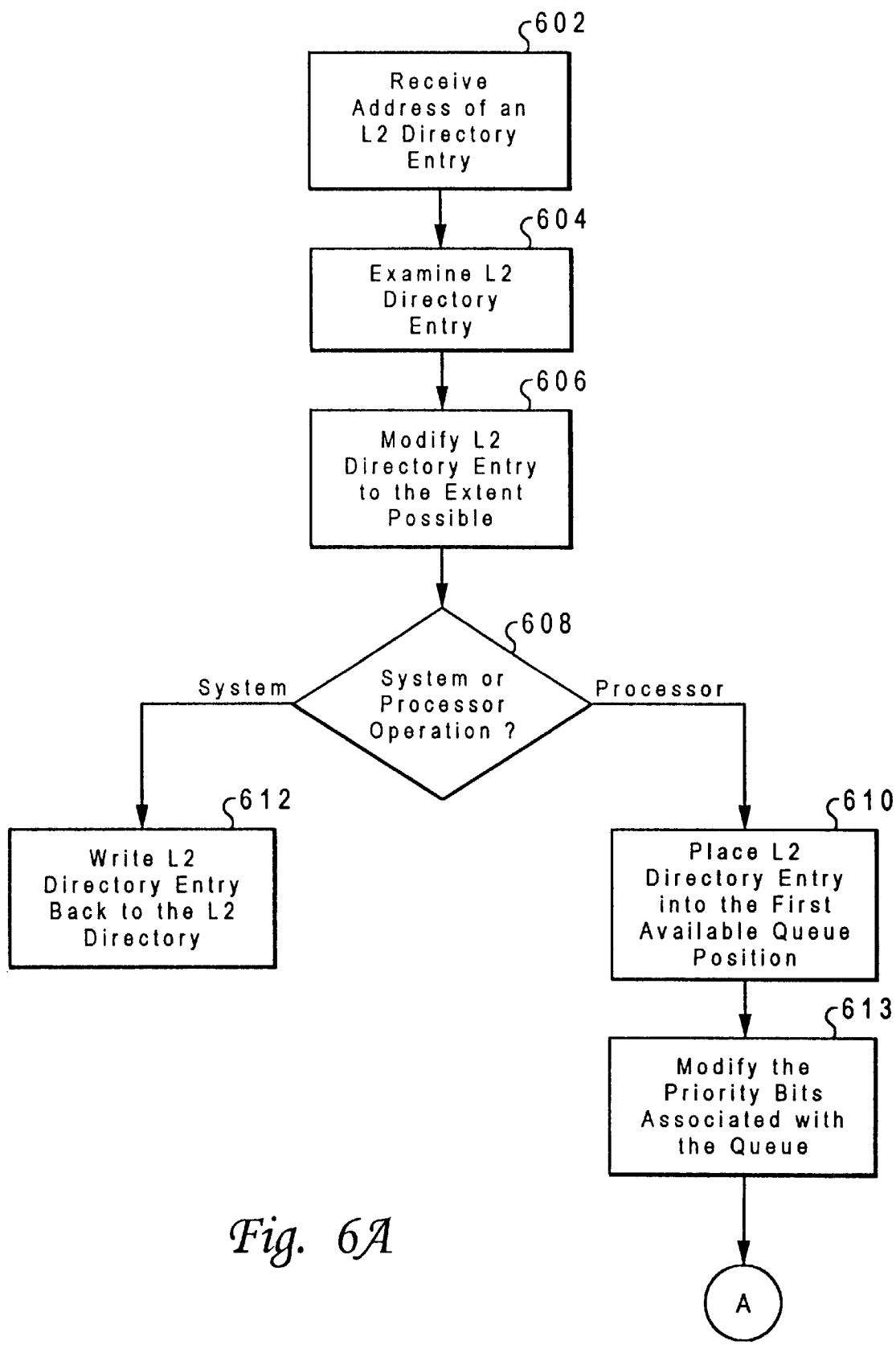
FIGS. 6A and 6B are a flowchart which illustrates how an L2 cache operating according to the present invention can store up to three requests to update entries in the L2 directory array.
Figure 6B:
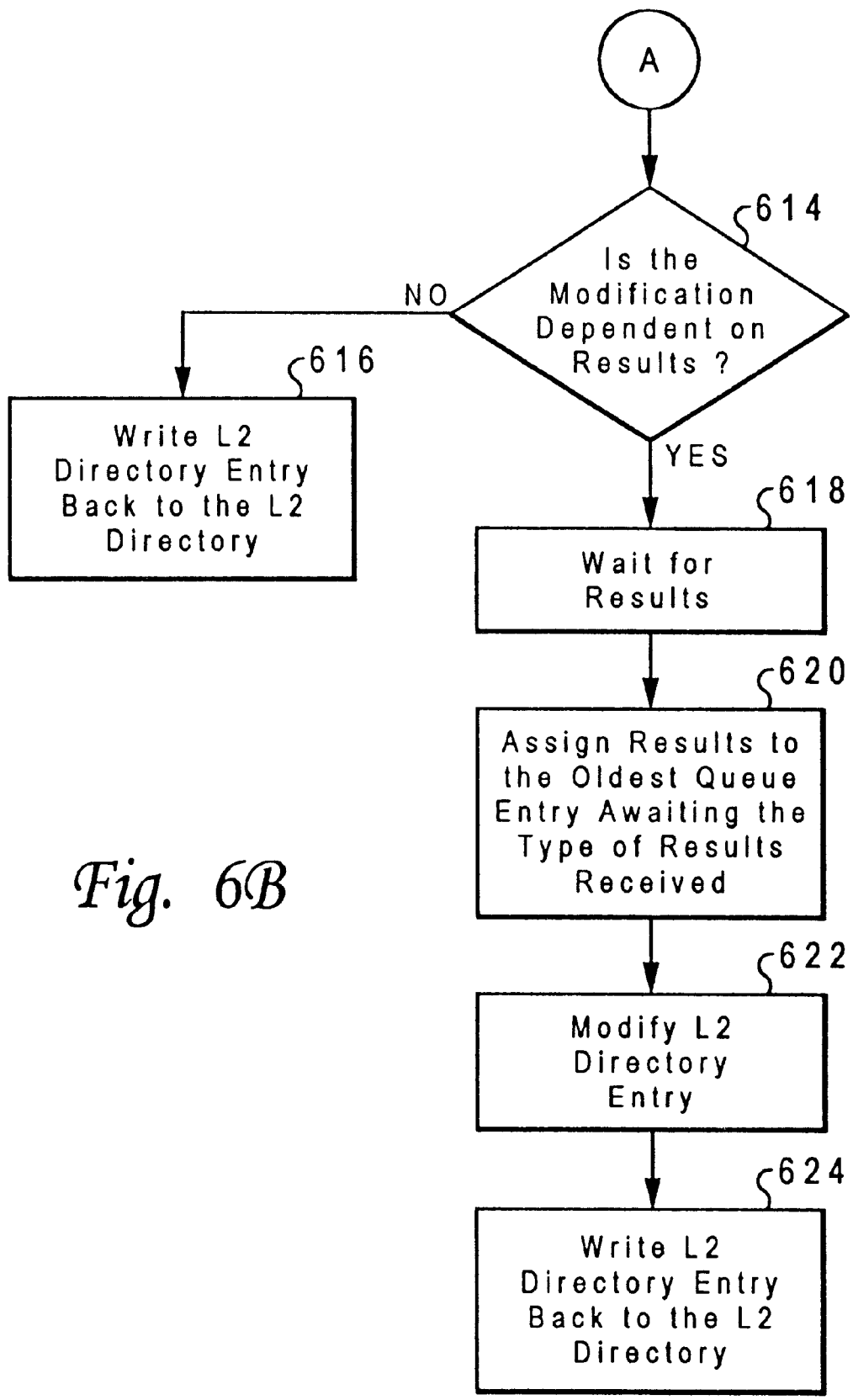

FIGS. 6A and 6B are a flowchart which illustrates a process whereby an L2 cache operating according to the present invention can store up to three requests to update directory entries in the L2 directory array. The method and apparatus to be described below can be used to write modified directory entries back to the L2 directory array in the pipelined flushing method and apparatus described above. Initially, the address of an entry in the L2 directory array is received (step 602). After the L2 directory entry has been retrieved, the entry is examined (step 604). If the L2 directory entry is being modified due to data received while the L2 cache controller was snooping the system bus, the L2 directory entry will be modified to the extent possible (step 606). Likewise, if the L2 directory entry is being modified due to a processor request, the L2 directory entry will be modified to the extent possible (step 606).

Often, some portions of the directory entry can be modified before the L2 directory is placed into the priority queue. However, other portions of the L2 directory entry can only be modified after results are received from the system bus. Thus, after being retrieved from the L2 directory array, the L2 directory entry will be modified to the extent possible.

In step 608 it is determined whether an operation is a system or a processor operation if the request to update an L2 directory entry is the result of the L2 cache snooping the system bus, the modified L2 directory entry will immediately be written back to the L2 directory (step 612). If the L2 directory entry is being modified as a result of a processor request, the L2 directory entry will be placed into the first available queue position (step 610).

In a preferred embodiment of the present invention, the queue into which the L2 directory entries are placed is a 3 position priority queue. As the L2 directory entry is being placed into the priority queue (step 610), a set of three priority bits associated with the priority queue is updated (step 613). These priority bits keep track of which L2 directory entry has been in the priority queue the longest.

With respect to FIG. 6B, a determination is made, in step 614, is dependent upon results if the L2 directory entry has already been fully modified and is not waiting for the results of a transaction occurring on the system bus, the L2 directory entry will be written back to the L2 directory (step 616. However, if the L2 entry in the priority queue cannot be completely modified until it receives the results of a transaction occurring on the system bus, the directory entry will stay in the priority queue and awaits such results (step 618). When the transaction on the system bus finishes, the L2 cache will receive the results of the transaction and these results will be assigned to the oldest entry awaiting the type of results received (step 620). After a given L2 directory entry is matched with all the results it is expecting to receive, the L2 directory entry can be fully modified (step 622) and written back to the L2 directory array (step 624).

Figure 7:
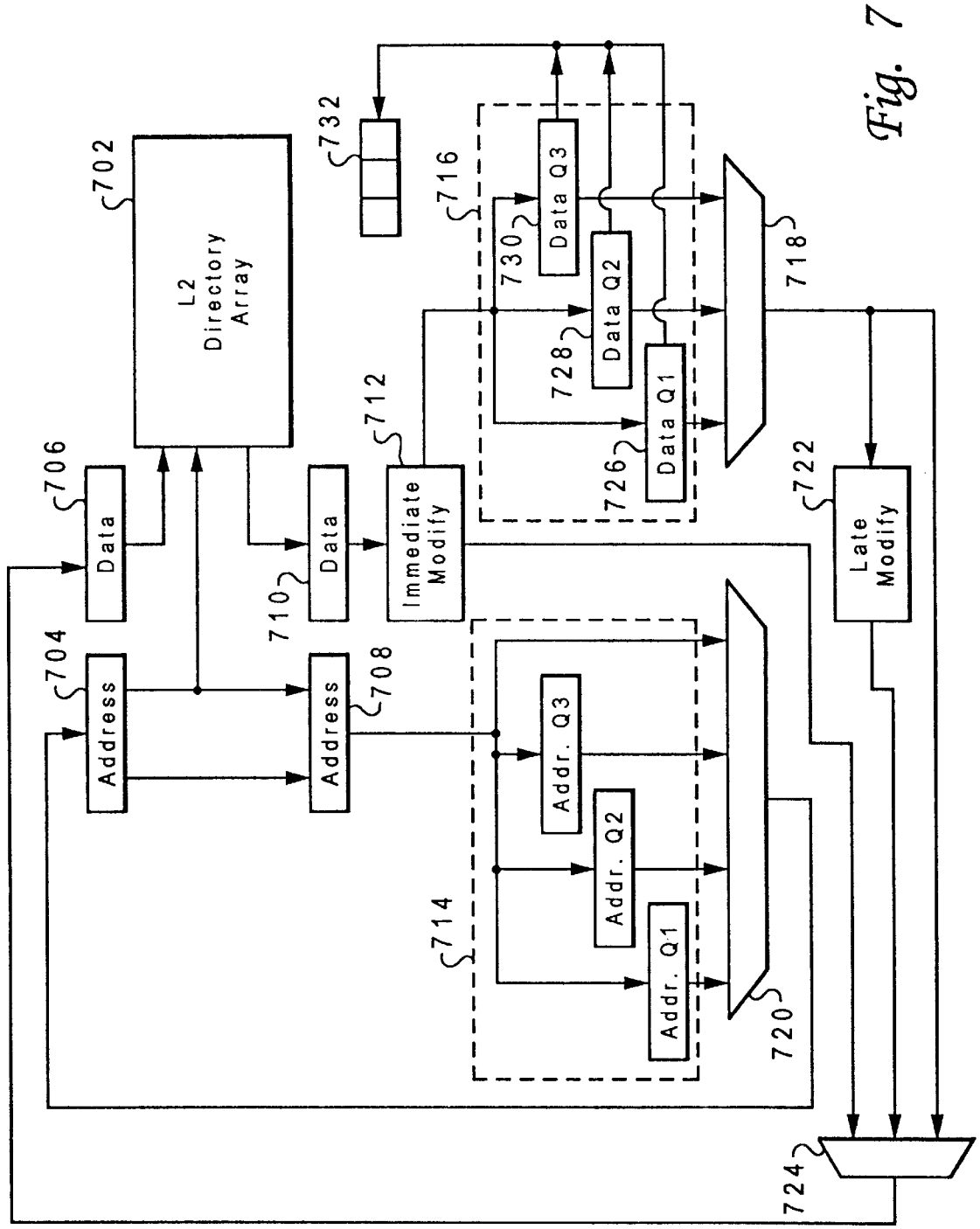
FIG. 7 illustrates a block diagram of a system which utilizes a priority queue to perform directory updates in an L2 cache according to the present invention.

FIG. 7 illustrates a block diagram of a system which utilizes a priority array to perform directory updates in an L2 cache controller according to the present invention. Initially, the address of an L2 directory entry is loaded into address register 704. The L2 directory entry address in address register 704 is presented to L2 directory array 702, and the L2 directory entry is returned into data register 710. Also, the address in address register 704 is transferred to address register 708.

After the L2 directory entry is loaded into data register 710, the L2 directory entry passes through immediate modify circuitry 712. Immediate modify circuitry 712 will modify the L2 directory entry (e.g., change the state of the MESI bits, or set or reset the L2 Inclusive bit) if the update of the L2 directory entry is the result of the L2 cache snooping the system bus. Further, if the L2 directory entry is being updated as the result of a processor operation, and all of the data necessary to update the L2 directory entry is available, immediate modify circuitry 712 will modify these entries as well. If all of the data necessary to modify the L2 directory entry is not available, immediate modify circuitry 712 will modify the L2 directory entry to the extent possible.

After being modified by immediate modify circuitry 712, and, if the L2 directory entry was being modified as the result of the L2 cache snooping the system bus, the L2 directory entry will be immediately routed through multiplexer 724 to data register 706. Likewise, the address of the L2 directory entry contained in address register 708 will pass through multiplexer 720 to address register 704. Once the L2 directory entry's address is in address register 704 and the L2 directory entry is in data register 706, the updated L2 directory entry will be written to L2 directory array 702.

If the L2 directory entry contained in data register 710 is being updated as the result of a processor operation, immediate modify circuitry 712 will modify the L2 directory entry, to the extent possible, and route the L2 directory entry into priority queue 716. The L2 directory entry from data register 710 will be loaded into the first available position in data queue 716. For instance, if position 726 is open, the L2 directory entry will be loaded into that position. If position 726 is occupied, the L2 directory entry will be attempted to be loaded into position 728, then position 730.

When a new L2 directory entry is loaded into data queue 716, priority bits 732, which indicate the data queue position that has been occupied the longest, are adjusted. As stated above, there are three bits associated with data queue 716. Bit 1, when set, indicates the L2 directory entry in position 726 arrived in data queue 716 before the L2 directory entry in position 728. In a similar manner, bit 2 indicates the L2 directory entry in position 726 arrived in data queue 716 before the L2 directory entry in position 730. Finally, bit 3 indicates the L2 directory entry in position 728 arrived in data queue 716 before the L2 directory entry in position 730. The above stated rules apply when bits 1, 2, and 3 are set. If the bits are not set, the inverse case of when the bits are set is true (e.g., if bit 1 is not set, the L2 entry in position 728 arrived in data queue 716 before the L2 entry in position 726, etc.).

Once an L2 directory entry has been inserted into one of the three positions in data queue 716, it will ultimately pass through multiplexer 718 and multiplexer 724 to be written to L2 directory array 702 via data register 106. If an L2 directory entry in data queue 716 was completely modified by immediate modify circuitry 712, that entry will be written directly from data queue 716 to L2 directory array 702. This type of operation is possible because the L2 directory entry does not have to wait for any type of results to be received from the system bus.

If an L2 directory entry in data queue 716 was not completely modified by immediate modify circuitry 712 because it was waiting for results from the system bus, this entry will stay in data queue 716 until the results upon which it is waiting are returned from the system bus. If there is more than one entry in data queue 716 which is waiting on the same type of result, priority bits 732 will be used to decide which queue entry will be matched with that result. For instance, if the entries in position 726 and position 730 are both waiting on a transfer acknowledge to be received from the system bus, when a transfer acknowledge is received, priority bits 732 will be examined to determine if the L2 directory entry in position 726 arrived before the L2 directory entry in position 730. Depending on how the bits are set, it will be determined which L2 directory entry has been in data queue 716 the longest, and the transfer acknowledge will be matched with that L2 directory entry.

Shown below are the logic equations for determining which directory entry in data queue 716 is to be matched to a particular result received.

MATCH1 := RESULT_x_RECEIVED &

(Q_ENTRY1_x & (Q_ENTRY2_x & Q2_b/f_Q1) &

(Q_ENTRY3_x & Q3_b/f_Q1))

MATCH2 := RESULT_x_RECEIVED &

(Q_ENTRY2_x & (Q_ENTRY1_x & Q1_b/f_Q2) &

(Q_ENTRY3_x & Q3_b/f_Q2))

MATCH3 := RESULT_x_RECEIVED &

(Q_ENTRY3_x & (Q_ENTRY1_x & Q1_b/f_Q3) &

(Q_ENTRY2_x & Q2_b/f_Q3))

Where, QX_b/f_QY represents that the directory entry in queue position X arrived before the directory entry in queue position Y; RESULT_x_RECEIVED is true if the result received is of the type x; Q_ENTRYX_x is true if the L2 directory entry in position X is expecting a result of the type x; and MATCHX represents the directory entry in queue 716 which is matched with the result. In a preferred embodiment of the present invention, a set of the above equations is implemented for each possible type of result.

If an L2 directory entry in data queue 716 was waiting on a result, and hence, it was not completely modified by immediate modify circuitry 712, when that L2 directory entry receives all the results it is expecting, it will be completely modified by late modify circuitry 722. The L2 directory entry is modified at this point because the modifications performed by late modify circuitry 722 are dependent upon the result received via the system bus. After the L2 directory entry is modified by late modify circuitry 722, it will pass through multiplexer 724 to data register 706 to be written to L2 directory array 702.

Address queue 714 is provided as a complement to data queue 716. Address queue 714 stores the addresses which correspond with the L2 directory entries in data queue 716. When an L2 directory entry passes out of data queue 716, its address will follow out of address queue 714 and will be placed into address register 704 at the same time the L2 directory entry is placed into data register 706.

An example showing how the queue positions are filled, and how the priority bits are set is shown below in Tables 1, 2, and 3. Initially, the processor sends to the L2 cache a read operation. The data requested by the processor is not in the L2 cache, and this read request is forwarded onto the system bus. At the same time, an entry in the L2 directory will be updated to signify the data to be returned on the system bus will now be contained in the L2 cache. However, before the particular entry in the L2 directory array can be completely updated, a system status result and a transfer acknowledge result must be received from the system bus. With respect to FIG. 7, this L2 directory entry will pass through data register 710 into data queue 716. For the purposes of this example, data queue 716 will be assumed to be empty before this first operation. In such a case, the directory entry will be placed into position 726.

Next, the processor issues a flush command to the L2 cache. In response to this flush command, the L2 cache will modify a particular L2 directory entry associated with the flush command. The particular L2 directory entry associated with the flush command will be retrieved from L2 directory array 702 and will be placed into data queue 716 in position 728. This L2 directory entry will be waiting on a system status result from the system bus. After this result is received, the L2 directory entry will be ready to be written to L2 directory array 702.

However, before any results are received from the system bus, the processor issues another read request to the L2 cache. Like the first read request, the data requested by the processor is not in the L2 cache, and hence, the request must be forwarded to the system bus. Like the first L2 directory entry in this example, the third L2 directory entry to be modified will be sent to data queue 716. Since positions 726 and 728 are filled, this third L2 directory entry will be placed in position 730. Also like the first read request, the third L2 directory entry will be waiting upon a system status result and a transfer acknowledge result to be returned over the system bus.

After the third L2 directory entry has been placed into position 730 and all three directory entries have received their system status results, data queue 716 will be in the state as shown in Table 1. As shown in Table 1, the entries in queue positions 1 and 3 are now waiting to receive a transfer acknowledge from the system bus. The entry in position 728 is now waiting to be modified by late modify circuitry 722.

TABLE 1

| Queue Position | Status of Queue Entry | Priority Bits |
| --- | --- | --- |
| 1 | Waiting to receive a transfer acknowledge | Q1_b/f_Q2-> Set |
| 2 | Waiting to be written to the L2 Directory Array | Q1_b/f_Q3-> Set |
| 3 | Waiting to receive a transfer acknowledge | Q2_b/f_Q3-> Set |

The status of the priority bits reflects that the queue was loaded in the order: position 1, then position 2, and then position 3.

After the third entry has been placed in position 730, the entry in position 728 is fully modified by late modify circuitry 722 and is written back to L2 directory array 702. When this occurs, data queue positions 726 and 730 contain L2 directory entries which are waiting for a transfer acknowledge result from the system bus. Before such a result comes back, the processor issues another read request. The L2 directory entry which corresponds to this read request will be read from L2 directory array 702 and placed in the only open position in data queue 716: position 728. At this point, the status of the queue will be as shown in Table 2. In Table 2, the first and third queue entries in positions 726 and 730, respectively, are still waiting to receive a transfer acknowledge from the system bus. In addition, the most recent L2 directory entry to be placed in the queue is waiting for a system status result to be returned from the system bus.

TABLE 2

| Queue Position | Status of Queue Entry | Priority Bits |
| --- | --- | --- |
| 1 | Waiting to receive a transfer acknowledge | Q1_b/f_Q2-> Set |
| 2 | Waiting for system status | Q1_b/f_Q3-> Set |
| 3 | Waiting to receive a transfer acknowledge | Q2_b/f_Q3-> Not Set |

Also, the priority bits in Table 2 will have changed from the priority bits as shown in Table 1. Since the L2 directory entry in position 726 is the oldest entry in data queue 716, the queue 1 before the queue 2 bit and the queue 1 before queue 3 bits will be set. However, since the L2 directory entry in position 728 is the most recent in queue 716, the queue 2 before queue 3 bit will not be set. This indicates that the entry in position 728 is newer than the entry in position 730.

At this time, a transfer acknowledge is received on the system bus by the L2 cache. Since there are two L2 directory entries in data queue 716 waiting on such a result, it must be determined which of the two L2 directory entries is the oldest. By using the logic equations shown above, the oldest L2 directory entry in data queue 716 will be matched with the results received on the system bus. In this instance, that will be the L2 directory entry in position 726. When it is determined that the result upon which the L2 directory entry in position 726 was waiting has been received, that particular L2 directory entry will pass through multiplexer 718 to late modify circuitry 722. Late modify circuitry 722 will modify the L2 directory entry in light of the result received on the system bus. The L2 directory entry will then pass through multiplexer 724 to data register 706 and will be written into directory array 702. After the directory entry in position 726 is written to L2 directory array 702, the state of queue 716 will be as shown in Table 3, below.

TABLE 3

| Queue Position | Status of Queue Entry | Priority Bits |
|---|---|---|
| 1 | Empty | Q1_b/f_Q2–> Not Set |
| 2 | Waiting for system status | Q1_b/f_Q3–> Set |
| 3 | Waiting to receive a transfer acknowledge | Q2_b/f_Q3–> Not Set |

Writing to an L2 directory array as described above provides several advantages over previous systems for writing to L2 directory arrays. First, a system operating according to the present invention uses less power than prior art systems for writing to L2 directory arrays. Many prior art systems employ queues which operate in a FIFO fashion. These FIFO queues often require entries in the queue to be shifted from one position to another. This type of operation consumes excessive amounts of power. On the other hand, L2 directory entries in the present invention, once they are placed in the data queue, stay in the same position until they are written back to the L2 directory array. This results in decreased power consumption.

Also, a priority queue operating according to the present invention requires only one port latches. Prior art FIFO queues often require multi-port latches to support their operation.

Additionally, a system for writing to the L2 directory array according to the present invention allows for the L2 directory entries in the priority queue to be written to the L2 directory array in a different order from which they were placed into the priority queue. The L2 directory entries can be written back to the L2 directory array at any time. In many prior art FIFO queues, one L2 directory entry which was waiting for a result to be returned from the system bus could block the processing of other L2 directory entries which, in all other respects, are ready to be written back to the L2 directory array.

Finally, if there is an empty queue position in the present invention, the priority queue can accept another L2 directory entry. In some prior art FIFO queues, a "bubble" can develop so that even though there is an empty position in the queue, that queue position cannot be filled until other entries have been processed.

Figure 8:
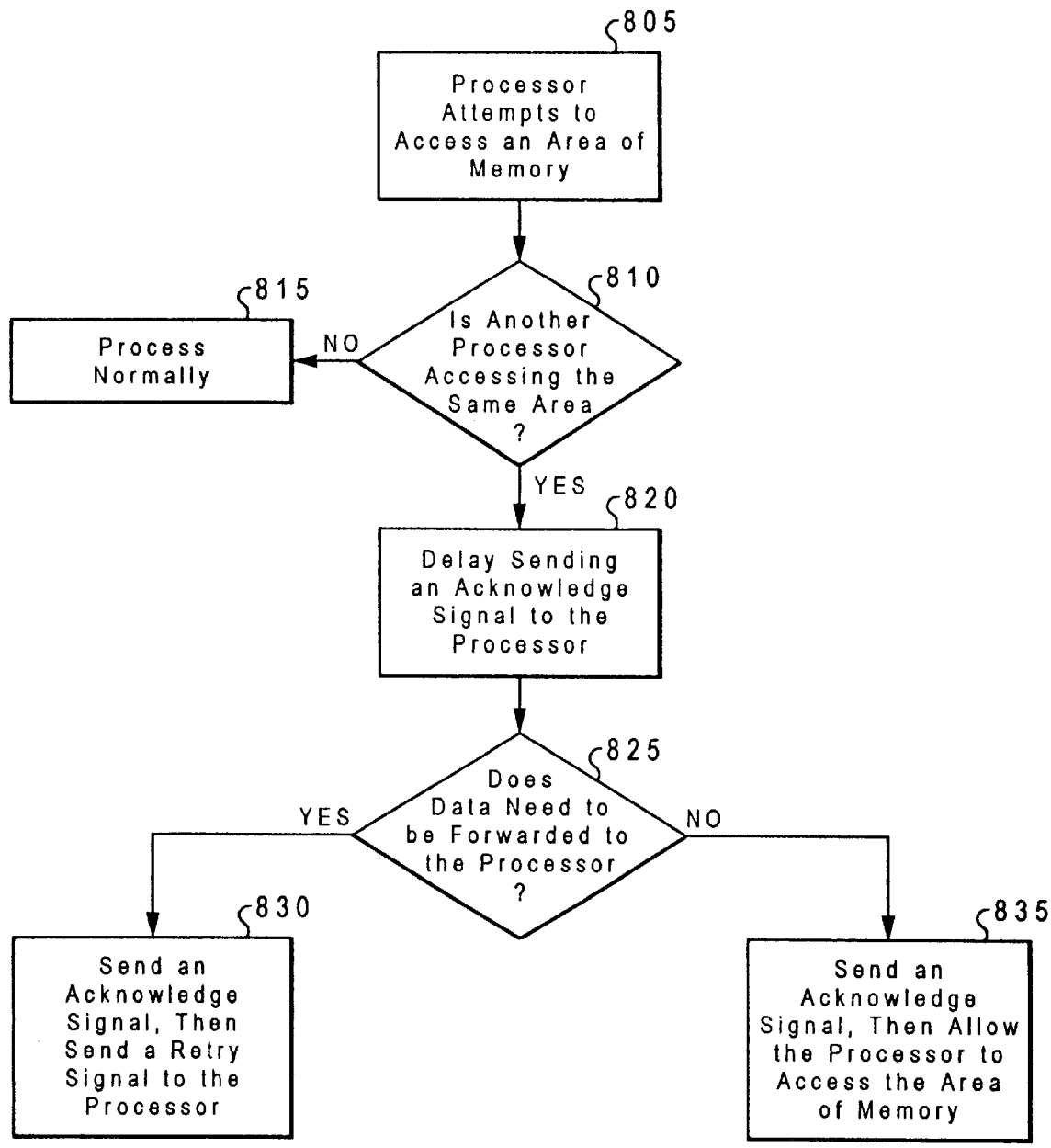
FIG. 8 is a flowchart which illustrates how an L2 cache controller operating according to the present invention can efficiently resolve collisions between a processor request and a request received over the system bus.

FIG. 8 is a flowchart which illustrates how an L2 cache controller operating according to the present invention can efficiently resolve collisions between processor requests and a request received over the system bus (a system request). In data processing systems which contain more than one computing unit, the situation will arise where more than one computing unit is trying to access the same resource. This resource is often an area of main memory. A typical collision involves a processor and another processor or computing unit trying to access the same memory location. These simultaneous attempts to access an area of memory are known as collisions. When a collision occurs, the L2 cache controller must act as an arbitrator between the processor request and system request. When current L2 cache controllers detect a collision between a request received from the processor and a system request, they send a RETRY signal to the processor. This RETRY signal cancels the processor's request for access and makes the processor retry its request at a later time. After sending a RETRY to the processor, the L2 cache controller allows the operation on the system bus to proceed. However, it takes the processor a relatively long amount of time to resend its request to the L2 cache controller after receiving a RETRY signal from the L2 cache controller. The process described in FIG. 8 illustrates how an L2 cache controller can avoid immediately sending a RETRY signal to the processor in the event of a collision.

Initially, the processor will attempt to access an area of main memory (step 805). This request will be forwarded to the L2 cache. A determination is made in step 810 to see if another processor is accessing the same area of memory if the L2 cache controller is currently processing a system request for access to the same area of memory as the processor request (or the L2 cache controller receives such a system request at the same time as the processor request or immediately thereafter), the L2 cache controller will delay sending an acknowledge (ACK) signal to the processor (step 820). (The processor request and the system request do not have to wish to access the exact same area of main memory. For instance, the L2 cache controller may snoop a request from the system bus which would access a line contained in the L2 cache. If the processor wished to access another portion of this line, there would still be a collision. Other events that can cause a collision include a congruence class hit and the L2 directory array being in use.) Normally, an ACK signal will be sent to the processor by the L2 cache controller when the L2 cache controller receives the address of the area of main memory requested by the processor (step 815). Not sending an ACK signal to the processor has the effect of postponing the completion of transferring the address from the processor to the L2 cache controller.

During the time when the L2 cache controller has received a request from the processor but has not sent back an ACK signal, the L2 cache controller determines if it will be necessary to send a RETRY signal to the processor in addition to an ACK signal. The L2 cache will send a RETRY signal to the processor if a system request would alter the status of a line in the processor's L1 cache. Such a system request could possibly affect the processor's view of main memory and would necessitate the L2 cache controller informing the processor of this change. By forwarding the data contained in these requests to the processor, the memory state seen by any given processor in the data processing system is maintained in a weakly consistent order.

If a system request needs to be forwarded to the processor as determined in step 825, the L2 cache controller will first send an ACK signal to the processor followed by a RETRY signal (step 830). This RETRY signal will cause the processor to abort its current attempt to access main memory and will stop the processor from accessing the bus which exists between the processor and the L2 cache. In addition, sending a RETRY signal to the processor will allow the L2 cache controller to send the data associated with the system request to the processor.

On the other hand, if the system request does not need to be forwarded to the processor in step 825, the processor will be sent an ACK signal after the system request is processed to the point where there is no longer contention between the processor and the system bus (step 835). The processor request to access main memory will then be granted. By not sending a RETRY signal to the processor when data does not need to be forwarded to the processor, the processor request can be more quickly serviced.

Figure 9:
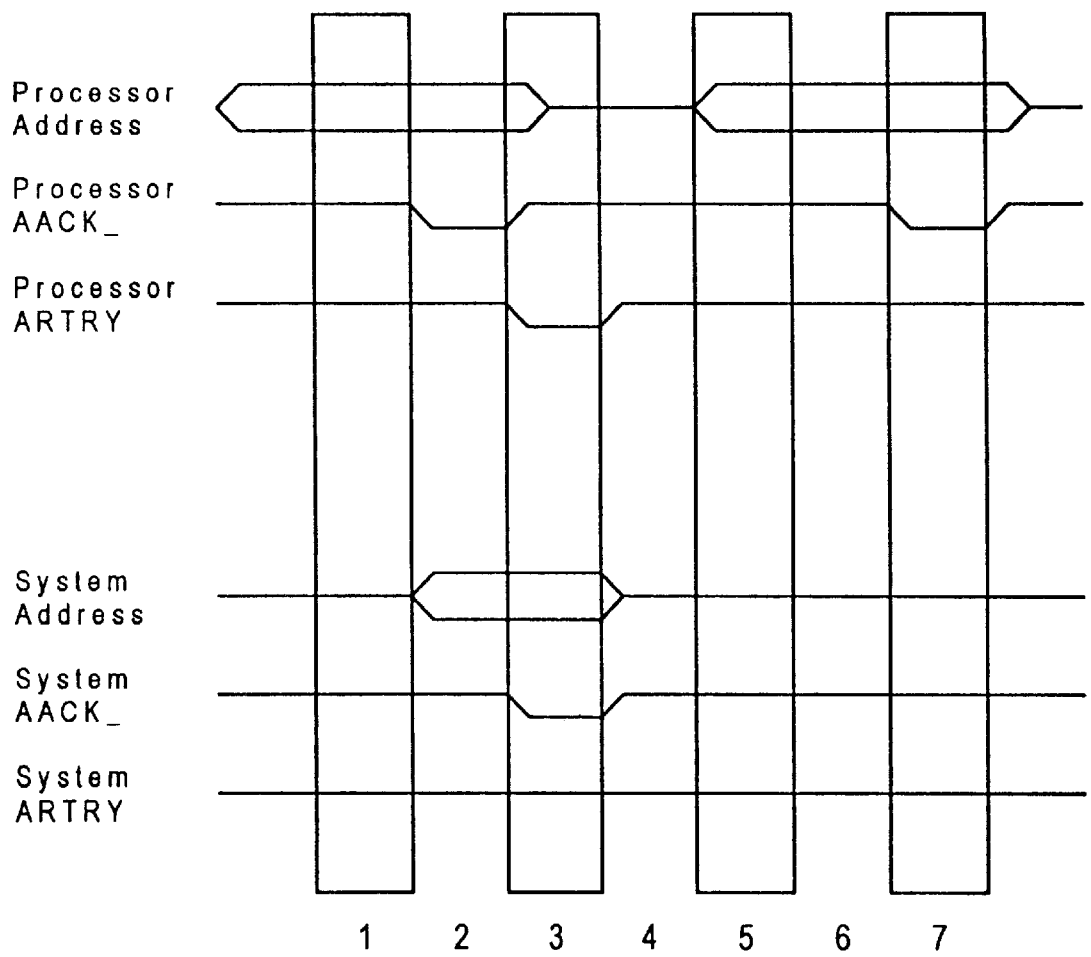
FIG. 9 illustrates a timing diagram of a prior art L2 cache sending a RETRY signal in response to detecting a collision.

FIG. 9 illustrates a timing diagram of a prior art L2 cache controller sending a RETRY signal in response to detecting a collision. In cycle 1, the processor places an address on the address bus which exists between the processor and the L2 cache. In cycle 2, an address is received on the system bus which accesses the same line in the L2 cache as does the address asserted by the processor. Also shown in cycle 2 is the L2 cache controller sending the processor an ACK signal.

In cycle 3, the processor has received an ACK signal from the L2 cache controller and de-asserts its address. However, the processor immediately receives a RETRY signal from the L2 cache controller. This RETRY signal causes the processor to abandon its attempted access, and to rearbitrate for the bus between the processor and the L2 cache. The L2 cache controller also sends an ACK signal over the system bus.

The RETRY signal is sent to the processor by the L2 cache controller even if the system request did not necessitate data being sent to the processor.

In cycles 5–7, the processor again sends a request to access main memory to the L2 cache controller. This time, there is no system request to cause a collision, and the processor request will be serviced by the L2 cache controller in a normal fashion.

Figure 10:
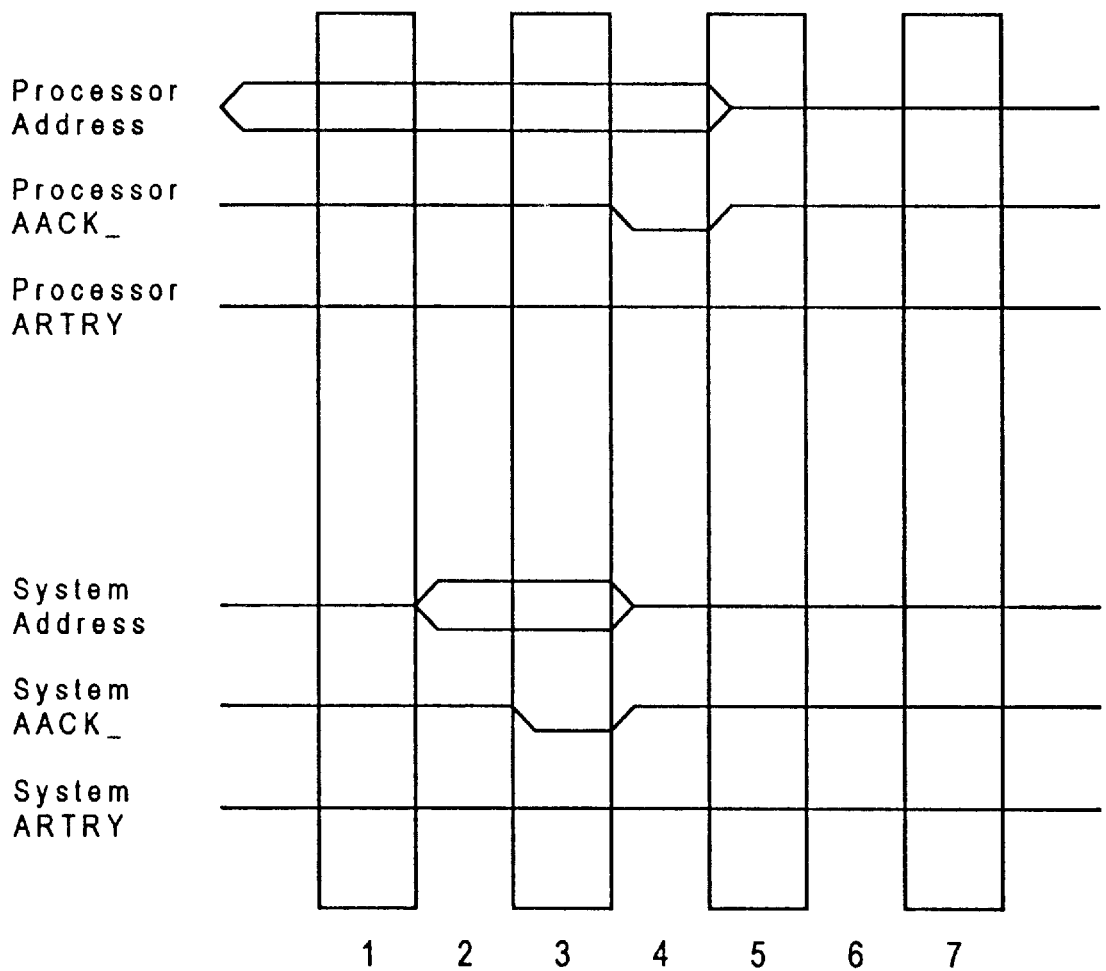
FIG. 10 illustrates a timing diagram of an L2 cache operating according to the present invention.

FIG. 10 illustrates a timing diagram of an L2 cache operating according to the present invention. In cycle 1, the L2 cache controller has received a request by the processor to access memory in the L2 cache. In cycle 2, the L2 cache controller receives a request from the system bus to access the same line in the L2 cache as the processor. However, instead of sending an ACK signal to the processor at this time, the L2 cache controller will delay sending an ACK signal. In cycle 3, the L2 cache controller sends an ACK signal over the system bus and begins to determine whether the system request needs to be forwarded to the processor. In cycle 4, the L2 cache controller has determined that data regarding the system request does not need to be sent to the processor. This allows the L2 cache controller to send an ACK signal to the processor.

In cycle 5, the processor determines that no RETRY signal is being sent from the L2 cache to the processor. At this point, the processor knows that the L2 cache controller has received its request and is processing that request. Thus, by delaying the sending of the ACK signal from the L2 cache controller to the processor, the processor request may be received more quickly than if the processor is unconditionally sent a RETRY signal in the event of a collision. This efficiency is created because the processor does not have to rearbitrate for the bus and encounter the corresponding time delays. The result of operating in the above manner is that for situations which do not require data to be sent to the processor, the number of cycles required to service a processor request is reduced.

Figure 11:
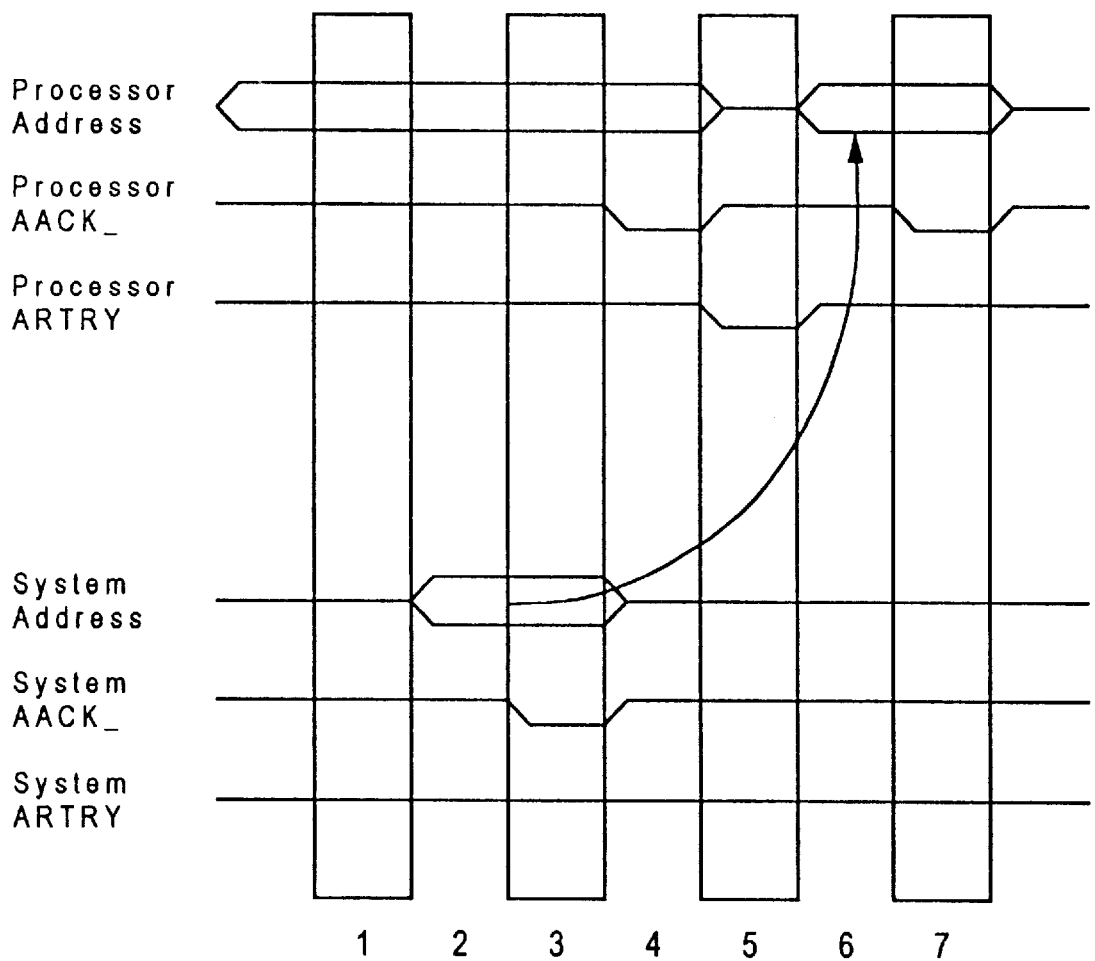
FIG. 11 illustrates an L2 cache operating according to the present invention in the case where a collision results in data being forwarded to the processor.

FIG. 11 illustrates an L2 cache operating according to the present invention in the case where a collision results in data being forwarded to the processor. Cycles 1–4 in FIG. 11 correspond with cycles 1–4 in FIG. 10. However, in the case shown in FIG. 11, the L2 cache controller determines that the system request could alter a line contained in the processor's L1 cache. In this situation, the processor must be updated with the data received from the system request in order to maintain a weakly consistent ordering. In order to accomplish this, the processor sends a RETRY signal to the processor in cycle 5. This removes the processor from the bus between the processor and L2 cache. In cycle 6, the L2 cache controller takes control of the bus between the processor and the L2 cache and puts onto this bus data associated with the system request. This allows the data in the processor's L1 cache to be updated. In a preferred embodiment of the L2 cache, in cycle 7, the L2 cache asserts its own ACK signal.

While the invention has been particularly shown and described with reference to a preferred embodiment, it will be understood by those skilled in the art that various changes in form and detail may be made therein without departing from the spirit and scope of the invention.

I claim:

1. A method for writing directory entries to an array of directory entries in a high-level cache, comprising:

placing the directory entries into the n-position priority queue;

updating priority indicators to indicate which order the directory entries were placed into the n-position priority queue;

waiting for a result to be received for the directory entries in the n-position priority queue;

receiving the result;

examining the priority indicators and the directory entries in the n-position priority queue;

selecting a specific directory entry from the directory entries in the n-position priority queue who has been in the n-position priority queue the longest and is expecting a type of result having characteristics of the result received; and, assigning the result received to the specific directory entry.

2. The method as described in claim 1, further comprising:

before the placing step, retrieving the directory entries from the array of directory entries.

3. The method as described in claim 1, further comprising:

after the assigning step, modifying the specific directory entry using data received with the result; and writing the specific directory entry to the array of directory entries.

4. The method as described in claim 1, wherein the step of placing the directory entries into the n-position priority queue comprises the step of placing the directory entries into a 3-position priority queue.

5. The method as described in claim 1, wherein the placing step is caused by a processor operation of a processor.

6. A high-level cache containing an apparatus for efficiently writing directory entries to an array of directory entries, comprising:

an n-position priority queue;

priority indicators connected to the n-position queue for indicating which order the directory entries were placed into the n-position priority queue; and modifying circuitry connected to the n-position queue for modifying the directory entries, the high-level cache being operable in a first mode of operation in which, the high-level cache places the directory entries into the n-position priority queue;

the high-level cache updates the priority indicators;

the n-position priority queue waits for a result to be received for the directory entries;

the high-level cache receives the result;

the high-level cache examines the priority indicators and the directory entries in the n-position priority queue;

the high-level cache selects a specific directory entry from the directory entries in the n-position priority queue who has been in the n-position priority queue the longest and is expecting a type of result having characteristics of the result received; and, the high-level cache assigns the result received to the specific directory entry.

7. The high-level cache as described in claim 6, wherein the first mode of operation further includes:

the high-level cache retrieving the directory entries from the array of directory entries.

8. The high-level cache as described in claim 6, wherein the first mode of operation further includes:

the high-level cache modifying the specific directory entry using data in the result received; and the high-level cache writing the specific directory entry to the array of directory entries.

9. The high-level cache as described in claim 6, wherein the n-position priority queue is a 3-position priority queue.

10. The high-level cache as described in claim 6, wherein the high-level cache is a L2 cache.

* * * * *